United States Patent [19]

Ichimura et al.

[11] 3,920,618
[45] Nov. 18, 1975

[54] NEW PHOTOPOLYMERS

[75] Inventors: Kunihiro Ichimura; Hideo Ochi, both of Yokohama, Japan

[73] Assignee: Director-General of the Agency of Industrial Science and Technology, Tokyo, Japan

[22] Filed: Oct. 5, 1973

[21] Appl. No.: 403,822

[30] Foreign Application Priority Data
- Oct. 6, 1972 Japan.............................. 47-100429
- Oct. 6, 1972 Japan.............................. 47-100430
- Dec. 28, 1972 Japan............................. 48-3533

[52] U.S. Cl............... 260/78 UA; 96/33; 96/35.1; 96/36.2; 96/86 P; 101/359; 117/5.5; 117/34; 117/93.31; 117/161 UA; 117/161 P; 204/159.22; 260/47 UA; 260/47 CZ; 260/78 A; 260/78 TF; 260/78.4 D

[51] Int. Cl.².............. C08B 69/44; C08G 73/16; C08G 63/00, C08F 18/44

[58] Field of Search...... 260/47 UA, 47 CZ, 78.4 A, 260/78 UA, 78 TF

[56] References Cited
UNITED STATES PATENTS

| | | | |
|---|---|---|---|
| 3,689,464 | 9/1972 | Holub | 260/78 TF |
| 3,717,615 | 2/1973 | Holub | 260/78 UA |
| 3,742,089 | 6/1973 | Schroeter | 260/78 UA |

*Primary Examiner*—Joseph L. Schofer
*Assistant Examiner*—Herbert J. Lilling
*Attorney, Agent, or Firm*—William J. Daniel

[57] ABSTRACT

Novel photopolymers having as photocrosslinking radicals α-substituted maleimido groups of the formula:

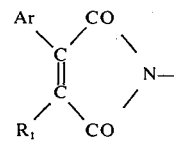

wherein Ar stands for a cyclic group of aromaticity and $R_1$ for a hydrogen atom or cyano group. These photopolymers can be produced by introducing the α-substituted maleimido groups into a backbone molecular chain of a linear polymer or copolymer according to a reaction known per se, such as amidation, imidation, esterification, quaternization or nuclear substitution.

14 Claims, No Drawings

NEW PHOTOPOLYMERS

BACKGROUND OF THE INVENTION

This invention relates to a new type photopolymer produced by taking advantage of photodimerization reaction of α-substituted maleimido groups.

In general, photosensitive resins are widely used as materials for manufacturing printing plates, photoresists for use in photoetching or photomilling, and photosensitive vehicles such as paints an printing inks. Such photosensitive resins known hitherto are produced by taking advantage of (1) photodecomposition of a diazo compound or an azide compound, (2) photocrosslinking of cinnamoyl, diazo, azido or acryloyl group, and (3) photopolymerization of acrylic esters or acrylamides. However, these known photosensitive resins are limited in their utility because the photosensitive groupings of these resins are reactive only in a liquid or solid state and are low in sensitivity so that they require the conjoint use of a sensitizer for practical application.

BRIEF SUMMARY OF THE INVENTION

It is, therefore, an object of this invention to provide a photopolymer which, in the absence of any sensitizer and in either liquid or solid state, easily undergoes photocrosslinking to render itself insoluble and infusible.

It is another object of this invention to provide linear polymers or copolymers having pendant α-substituted maleimido groups.

It is still another object of this invention to provide a process for effectively introducing α-substituted maleimido groups into linear polymers or copolymers.

Other objects, features and advantages of this invention will be apparent from the following description.

DETAILED DESCRIPTION OF THE INVENTION

The photopolymer of this invention comprises a linear polymer or copolymer having as side chains the following group:

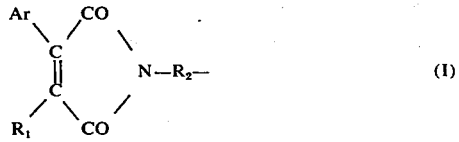
(I)

wherein Ar stands for a cyclic group of aromaticity, $R_1$ for a hydrogen atom or a cyano group and $R_2$ for a divalent organic radical.

The term "a cyclic group of aromaticity" is used herein to mean a carbocyclic or heterocyclic group having $4n+2$ adjacent π-electrons where $n$ is 1 or 2. Examples of such group include phenyl group, naphthyl group, pyridyl group, thienyl group and furyl group. These cyclic groups of aromaticity may have their nucleus substituted by one or more inert groups such as alkyl or alkoxy groups.

In formula (I), $R_2$ is a divalent organic radical connecting the polymer backbone chain and the α-substituted maleimido group and may have various structures according to the means for introducing the α-substituted maleimido groups into the backbone molecular chain.

When the photopolymer of this invention in either a liquid or solid state is exposed to light, intermolecular linkages will be formed in the photopolymer whereby infusibility and insolubility of the photopolymer are attained, according to the following mechanism:

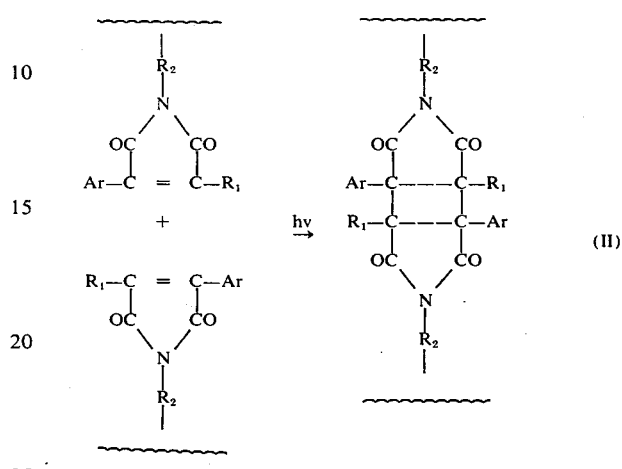
(II)

The photopolymers of this invention are produced by introducing α-substituted maleimido groups into the backbone molecular chain of a linear polymer or copolymer according to such reaction as imidation, amidation, quaternization, nuclear substitution or esterification.

Below are several embodiments of this invention for producing the photopolymers.

1. A method taking advantage of imidation:

A linear polymer or copolymer having free amino groups in its side chains is reaction with a maleic anhydride derivative of the formula:

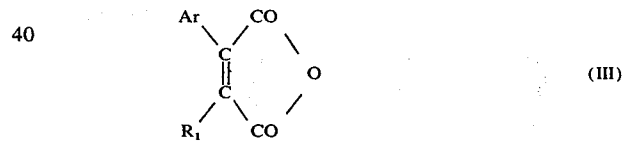
(III)

wherein Ar and $R_1$ have the same meanings as given above, and then the reaction product is subjected to a heat treatment.

As polymers or copolymers having free amino groups utilizable in the above reaction as the backbone polymer, there can be mentioned, for example, homopolymers of monomers having a free amino group, such as allylamine, p-aminostyrene, aminoethyl vinyl ether and acrylamide, or copolymers of such monomers with other ethylenically unsaturated monomers, for example, ethylene, vinyl chloride, acrylic acid, acrylonitrile, vinyl acetate and styrene.

The reaction between the backbone polymer having free amino groups and the maleic anhydride derivative is carried out by mixing given amounts of the starting materials in a polar solvent, such as dimethylformamide or dimethylsulfoxide, and stirring the mixture. In this case, the maleic anhydride derivative is first reacted with the free amino group to form groups of the general formulae:

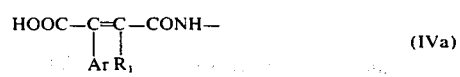
(IVa)

or

  (IVb)

wherein Ar and $R_1$ have the same meanings as given above. When this grouping is heated at 70°–140°C, it is dehydrocyclized to form an α-substituted maleimido group of the general formula:

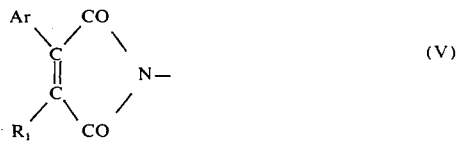  (V)

wherein Ar and $R_1$ have the same meanings as given above.

On the other hand, the desired photopolymer can be obtained also by reacting a backbone polymer having maleic anhydride groups, for example, a copolymer of maleic anhydride and other copolymerizable monomers such as methyl vinyl ether, with an ω-(α-substituted-maleimido)-alkylamine of the formula:

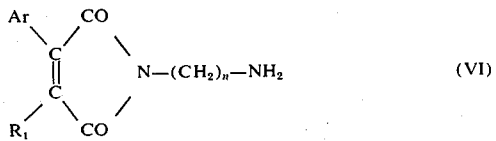  (VI)

wherein Ar and $R_1$ have the same meanings as given above and $n$ is an integer of 1–6.

2. A method taking advantage of quaternization:

A backbone polymer having tertiary amino groups is reacted in a polar solvent with an N-haloalkylmaleimide derivative of the formula:

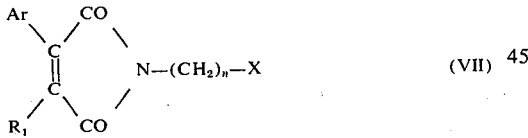  (VII)

wherein Ar, $R_1$ and n have the same meanings as given above and X stands for a halogen atom.

Examples of polymers or copolymers having tertiary amino groups utilizable as the backbone polymer in this case include homopolymers of vinylpyridine or dialkyl-aminoalkyl esters of acrylic or methacrylic acid and copolymers of these monomers with other copolymerizable monomers, such as styrene, acrylic or methacrylic esters and acrylonitrile.

Examples of the N-haloalkylmaleimide derivative of formula (VII) include N-chloromethyl-α-phenylmaleimide, N-chloromethyl-α-phenyl-β-cyanomaleimide, N-bromomethyl-α-phenylmaleimide, N-chloroethyl-α-tolylmaleimide, N-chloropropyl-α-pyridylmaleimide and the like.

The reaction between the backbone polymer and an N-haloalkylmaleimide derivative of formula (VII) is carried out smoothly by mixing both and bringing them into contact with each other. In this case, it is advantageous to use a suitable organic solvent, such as methanol, ethanol, diethyl ether of dimethylformamide.

In this reaction, the use of a hydrophilic monomer, such as acrylamide, N-vinyl-pyrrolidone or the like, as a monomer for the backbone polymer has the technical advantage that quaternization of the tertiary amino groups renders the polymer water-soluble, thus making it possible to attain development with water.

3. A method taking advantage of nuclear substitution:

A linear polymer or copolymer having pendant aromatic rings is reacted in the presence of a Lewis acid catalyst with an α-substituted maleimide derivative of the general formula:

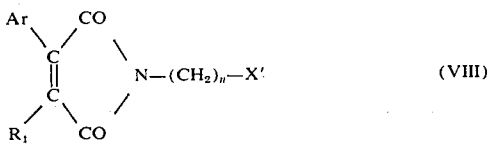  (VIII)

wherein Ar, $R_1$ and n have the same meanings as given above and X' stands for a halogen atom or hydroxy group.

Examples of a linear polymer or copolymer having aromatic rings utilizable as the backbone polymer in this case include homopolymers of styrene, substituted styrene, phenyl ester of acrylic or methacrylic acid, benzyl ester of acrylic or methacrylic acid and β-phenylethyl ester of acrylic or methacrylic acid, as well as copolymers of such monomers with other copolymerizable monomers, such as acrylonitrile, acrylic esters, methacrylic esters, vinyl ether, vinyl acetate and vinyl chloride.

Examples of α-substituted maleimide derivatives of formula (VIII) include, in addition to those shown as having the formula (VII), N-methyl-α-phenyl-β-cyanomaleimide and N-(β-hydroxyethyl)-α-pyridylmaleimide.

The reaction for introducing the α-substituted maleimido group into the backbone polymer is one type of the so-called Friedel-Crafts reaction and therefore is carried out in such solvent as dichloroethane, trichloroethylene, tetrachloroethane, nitromethane, nitroethane or nitrobenzene in the presence of a Lewis acid catalyst, for example, zinc halide, aluminum halide or boron trifluoride but in the absence of moisture.

The reaction is conducted usually at a temperature ranging from 80°C to 150°C for 0.5–30 hours. After completion of the reaction, a non-solvent such as a hydrocarbon or alcohol is added to the reaction liquid and the precipitated white to light brown rubbery resin is separated and dried by means of any suitable drying operation such as vacuum drying.

4. A method taking advantage of esterification:

A linear polymer or copolymer having acid halide residues is reacted with a hydroxyl group-containing maleimide derivative of the formula:

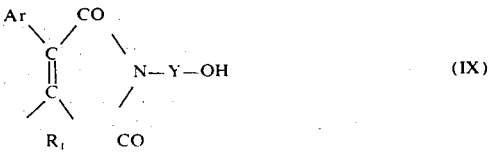  (IX)

wherein Ar and $R_1$ have the same meanings as given above and Y stands for an alkylene or arylene radical, or, alternatively, a linear polymer or copolymer having hydroxyl groups is reacted with an acid halide having a specific α-substituted maleimido group of the formula:

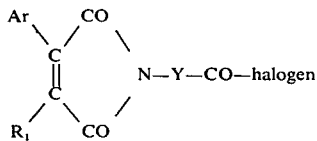

wherein Ar, $R_1$ and Y have the same meanings as given above.

Examples of linear polymers and copolymers having acid halide residues include homopolymers of acrylic halides or methacrylic halides and copolymers of such monomers with other copolymerizable monomers.

Examples of compounds of formula (IX) include, in addition to the hydroxyl compounds shown as having formula (VIII), N-(p-hydroxyphenyl)-α-phenylmaleimide and N-(p-hydroxybenzyl)-α-phenylmaleimide.

Examples of the backbone polymers having hydroxyl groups include polyvinyl alcohol, partially hydrolyzed polyvinyl acetate and a partial hydrolyzate of a copolymer of vinyl acetate and another monomer. Mentioned as examples of compounds of formula (X) are phenylmaleoylglycine, phenylmaleoylalanine and γ-(phenylamleimido)-butyric acid halide.

These procedures involve an ester-forming reaction between an acid halide and an alcohol and can be carried out smoothly by mixing the reactants in an adequate organic solvent.

It is advantageous to add to the reaction system a basic substance, for example, a tertiary amine such as pyridine, triethylamine, picoline or dimethylaniline to remove a hydrogen halide generated in the reaction system thereby promoting the reaction.

Unlike known conventional photosensitive resins which exhibit photosensitivity only in the event photosensitive radicals are introduced into the backbone polymer at a high rate of substitution of 50% or more, the photosensitive resins of this invention obtained in the above-mentioned ways show good sensitivity at a rate of substitution as low as 10% or less and attain insolubilization even at a rate of substitution of 1% or less. This is one of the characteristic properties of the photosensitive resins of this invention.

As the photosensitive resins of this invention permit introduction of the specific photosensitive radicals at a high rate of substitution up to 70–80%, this invention makes it possible to produce photosensitive resins of any desired rate of substitution. Thus, photosensitive elements of a desired sensitivity can be obtained. The photosensitive radicals in the resins of this invention show a maximum absorption at 340–360 μ but show no substantial change to light having a wave length of 400 μ or more. Accordingly, no special dark room is required for preparation and handling of the photosensitive resins of this invention. Moreover, the reaction efficiency of the photosensitive resins is scarcely affected by oxygen, thus bringing about the feature that the photosensitive resins or elements can be handled in the atmosphere.

The photosensitive resins of this invention are insolubilized in the absence of any sensitizer by irradiation of light for a short period of time, say a few seconds, and so are suited as photoresists, PS plates for printing use, copying materials, memory elements, etc.

Developing liquids for these applications are selected according to the kind of backbone polymer used and include, in addition to non-hydric organic solvents such as hydrocarbons, water and alcohols such as methanol, ethanol and propanol and diluted hydrochloric acid.

This invention will be more clearly understood with reference to the following examples.

EXAMPLE 1

Into an ampule were charged 2.0 g of p-aminostyrene, 4.0 g of styrene and 0.12 g of azo-bis-isobutyronitrile. The ampule was evacuated, sealed and heated at 60°C for 23 hours to effect reaction. The reaction product was dissolved in benzene and poured into cyclohexane to precipitate a slightly brown polymer in an almost quantitative yield.

In 5 ml of dimethylformamide was dissolved 0.5 g of this polymer and the solution was filtered to remove any insoluble matter. To the filtrate was then added 0.25 g of phenylmaleic anhydride and the resulting mixture was stirred for 5 minutes at room temperature to obtain a slightly yellow liquid. By IR-adsorption spectrometry, this reaction product was observed to have amidocarboxylic acid residues. A solution of the reaction product was coated on an aluminum plate having been subjected to a surface treatment and dried at 50°C to obtain a colorless to light yellow, transparent film showing good adhesiveness to the support. This film was exposed for 5–10 seconds to the light from a 450-W ultra-high pressure mercury lamp through an original image, dipped into dimethylformamide for 30 seconds and washed with acetone to obtain a sharp reproduced image.

EXAMPLE 2

In 15 ml of ethanol were dissolved 300 mg of poly(4-vinylpyridine) and 100 mg of N-chloromethyl-α-phenylmaleimide. The solution was heated under reflux for 5 hours with stirring, cooled to room temperature and allowed to stand overnight. The reaction mixture was poured into n-hexane in an amount of ten times as much as the reaction mixture to precipitate the product which was then separated by decantation and dried in vacuo.

A photosensitive resin thus obtained was dissolved in ethanol and the solution was applied onto the surface of an aluminum plate and dried. The film thus obtained was insolubilized in 5 seconds when subjected to an exposure treatment using a 450-W ultra-high pressure mercury lamp.

EXAMPLE 3

In 15 ml of ethanol were dissolved 300 mg of poly(2-vinylpyridine) and 120 mg of N-chloromethyl-α-phenyl-β-cyanomaleimide and the solution was heated for 6 hours under reflux. The ethanol was then removed from the reaction mixture by distillation under reduced pressure and the residue was dissolved in acetone and precipitated as a viscous resin by addition of petroleum ether. This product was dried under vacuum to obtain a photosensitive resin in a yield of 310 mg. The photosensitive resin was worked up to a film and radiated by light from a 450-W mercury lamp whereby the resin was insolubilized in 10 seconds.

EXAMPLE 4

In 4 ml of dichloroethane were dissolved 260 mg of polystyrene. To this solution were then added 1000 mg of N-chloromethyl-α-phenylmaleimide and 40 mg of zinc chloride and the resulting mixture was refluxed for 7 hours while intercepting light and moisture. The reaction mixture was then cooled and poured into a large amount of methanol under agitation. The resulting precipitate was collected by filtration and the filter cake was washed well with methanol and dried to yield 280 mg of the desired photosensitive resin. The result of UV-absorption spectrometry showed that the rate of substitution of phenylmaleimidomethyl groups in the resin was about 8.6 mol %.

The resin was then dissolved in dichloromethane and the solution was applied onto the surface of an aluminum plate, dried and heated for 5 minutes at 80°C. The film thus obtained was easily insolubilized when irradiated for 3 seconds from the light from a 450-W ultra-high pressure mercury lamp. In case a printing plate is manufactured from this resin, benzene, dichloroethane, acetone and trichloroethane are suitable as developing liquid therefor.

EXAMPLE 5

To 352 mg of poly(benzyl methacrylate) having a polymerization degree of about 5400 dissolved in 10 ml of tetrachloroethane were added 100 mg of light yellow N-bromomethyl-α-phenylmaleimide obtained by bromination of N-methylol-α-phenylmaleimide in acetone with phosphorus tribromide. To this mixture was further added 20 mg of anhydrous zinc chloride and the whole was refluxed for 5 hours. The reaction mixture was poured into a large excess amount of methanol and the resulting precipitate was collected by filtration, washed well with methanol and then dried in vacuo. The resin thus obtained was completely insolubilized when irradiated for 10 seconds by the light from a 500-W xenon lamp.

EXAMPLE 6

Into an ampule were charged 3.31 g of acrylic chloride and 3.31 g of methyl methacrylate. To the mixture were added 13 mg of azo-bis-isobutyronitrile and the ampule was evacuated, sealed and heated at 50°C for 20 hours to effect reaction. The bulk polymerizate thus obtained was dissolved in dichloroethane to prepare 100 cc of a solution of the polymerizate.

To 6 cc of the dichloroethane solution of acrylic chloride methyl methacrylate copolymer were added 600 mg of N-(2-hydroxyethyl)-α-phenylmaleimide and then 20 ml of dichloroethane. The mixture was refluxed for 3 hours and, after addition of 3 ml of methanol, again refluxed for 1 hour. The reaction mixture was then poured into a large amount of cyclohexane and the precipitated resin was collected by filtration. This resin was dissolved in trichloroethylene and the solution was applied onto the surface of an aluminum plate to form a film. The resulting film was exposed imagewise to the light from a 500-W xenon lamp for 15 second and then developed with acetone whereby a sharp negative image was obtained.

EXAMPLE 7

Into 20 ml of anhydrous pyridine were suspended 262 mg of polyvinyl alcohol (saponification value: 80%; degree of polymerization: 1700). To this suspension were added 280 mg of benzoyl chloride and 500 mg of phenylmaleoylglycine chloride and the resulting mixture was then stirred at 100°C for 5 hours to obtain a homogeneous yellowish brown solution. This reaction liquid was poured into a large amount of water to precipiate a polymer which was then collected by filtration and washed well with water. The foregoing operations were carried out under irradiation of light from a yellow lamp. The resin thus obtained was dissolved in trichloroethylene and the soltuion was applied onto an aluminum plate to form a film. The film was exposed imagewise to the light from a 500-W xenon lamp for 15 seconds and then developed with a mixed solvent of dimethylformamide or dichloroethane and methanol whereby a sharp negative image was obtained.

What is claimed is:

1. Photopolymers characterized by a vinyl polymer backbone having as photocrosslinking radicals α-substituted maleimido groups of the formula:

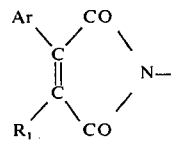

wherein Ar stands for a cyclic group of aromaticity and $R_1$ for a hydrogen atom.

2. Photopolymers according to claim 1 which comprise a linear vinyl polymer or copolymer having as pendant groups therealong, groups of the formula:

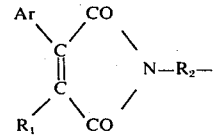

wherein Ar stands for a cyclic group of aromaticity, $R_1$ for a hydrogen atom and $R_2$ for a divalent organic radical.

3. Photopolymers according to claim 2 wherein Ar is a phenyl group.

4. Photopolymers according to claim 2 wherein Ar is a substituted phenyl group.

5. Photopolymers according to claim 2 wherein Ar is a pyridyl group.

6. Photopolymers according to claim 2 wherein said group is p-(α-phenylmaleimidi)-phenyl.

7. Photopolymers according to claim 2 wherein said group is α-phenylmaleimidomethylpyridinium chloride-(4).

8. Photopolymers according to claim 2 wherein said group is α-phenyl-β-cyano-maleimidomethyl-5-ethyl-pyridinium chloride-(4).

9. Photopolymers according to claim 2 wherein said group is α-phenylmaleimidomethylphenyl.

10. Photopolymers according to claim 2 wherein said group is α-phenylmaleimidomethylbenzyl.

11. Photopolymers according to claim 2 wherein said group is 2-(α-phenylmaleimido)-ethyloxycarbonyl.

12. Photopolymers according to claim 2 wherein said group is α-phenylmaleimidoaclyloxy.
13. Photopolymerizable linear vinyl polymers containing recurring structural units of the formula:
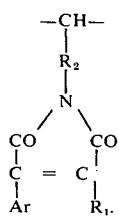
where $R_1$ is hydrogen.
14. The polymers of claim 13 wherein at about 1% up to about 80% of the recurring units thereof have said formula.
* * * * *

UNITED STATES PATENT AND TRADEMARK OFFICE
CERTIFICATE OF CORRECTION

PATENT NO. : 3,920,618
DATED : November 18, 1975
INVENTOR(S) : Kunihiro Ichimura et al It is certified that error appears in the above-identified patent and that said Letters Patent are hereby corrected as shown below:

In the Claims:

Column 9, line 2, "α-phenylmaleimidoaclyloxy" should read -- α-phenylmaleimidoacetyloxy --.

Signed and Sealed this tenth Day of February 1976

[SEAL]

Attest:

RUTH C. MASON
*Attesting Officer*

C. MARSHALL DANN
*Commissioner of Patents and Trademarks*